March 24, 1964  S. J. GUARINO  3,125,868
AUTOMATIC AUTOMOBILE RADIATOR COOLER
Filed Aug. 11, 1958
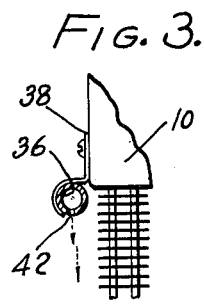
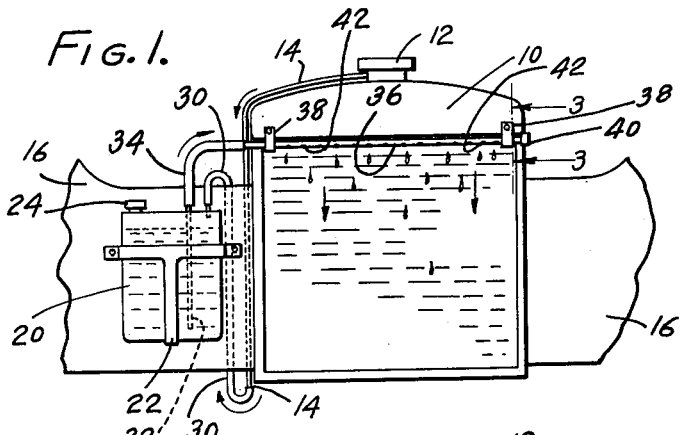
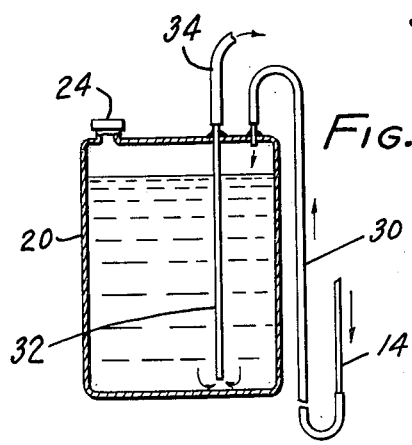
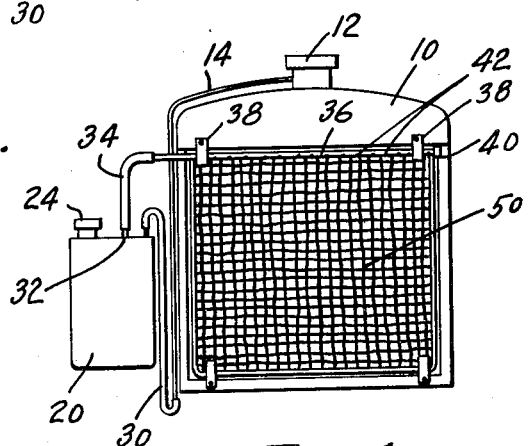
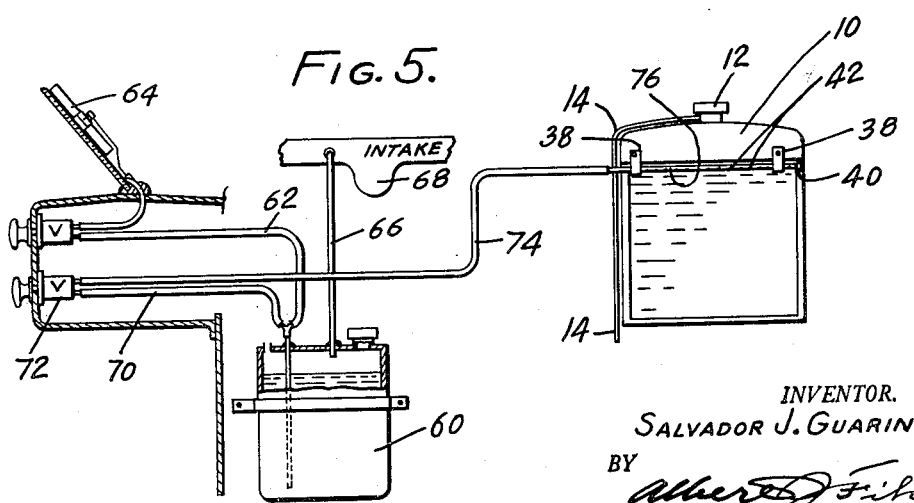
INVENTOR.
SALVADOR J. GUARINO
BY
ATTORNEY

United States Patent Office 3,125,868
Patented Mar. 24, 1964

3,125,868
AUTOMATIC AUTOMOBILE RADIATOR COOLER
Salvador J. Guarino, 4917 Elton St., Baldwin Park, Calif.
Filed Aug. 11, 1958, Ser. No. 754,263
1 Claim. (Cl. 62—316)

This invention relates to an improved automatic automobile radiator cooler and has for one of its principal objects the provision of a device of the class described which will act to automatically cool the radiator of an automotive vehicle, such as a passenger car or truck when the same becomes over-heated for any reason.

One of the important objects of this invention is to provide automatic cooling means for the radiator of internal combustion engines, especially those used in transportation, which cooling means will spray water or some other liquid upon and over the external surfaces of the radiator, said water or other liquid emanating from a secondary source.

Another and further important object of this invention is to provide an auxiliary supply of cooling liquid for an automobile radiator which will be automatically sprinkled onto the radiator the very instant that the original cooling liquid inside the radiator becomes heated to the point of vaporization due to excessive exterior temperatures or possibly faulty operation of the engine for one reason or another.

Yet another object of the invention relates to the production of a relatively simple and quite inexpensive appurtenance for the cooling radiators of automotive vehicles which can be readily installed, which will fit practically any of such vehicles with little or no adaptation or change and which requires practically no attention in order to be kept in instantaneous working order.

Other and further important objects of the invention will be apparent from the disclosures in the accompanying drawings and following specification.

The invention, in a preferred form, is illustrated in the drawings and hereinafter more fully described.

In the drawings:

FIGURE 1 is a front elevation, parts being broken away, showing a representative automotive vehicle radiator equipped with the automatic cooling apparatus of this invention.

FIGURE 2 is a detail view of the actual automatic radiator cooling apparatus of this invention on a slightly larger scale and with certain parts omitted.

FIGURE 3 is an enlarged view, partly in section, taken on the plane of the line 3—3 of FIGURE 1, looking in the direction indicated by the arrows.

FIGURE 4 illustrates the same invention, but with one additional piece of equipment associated therewith.

As shown in the drawings:

The reference numeral 10 indicates generally the radiator of an automotive vehicle equipped with an internal combustion engine of the type which includes a water cooled jacket.

Radiators of this type are equipped with a removable cap 12, which cap includes, as an integral part thereof, a spring-pressed valve or closure, which, in addition to preventing undesirable overflow of the cooling liquid inside the radiator, is so constructed that it will automatically open if the temperature of the water or other cooling liquid in the radiator reaches the boiling point. This then allows the products of vaporization to escape through the usual overflow pipe 14, which pipe is also standard equipment in practically all modern automobiles.

The radiator itself is supported in any convenient manner on the frame or chassis of the automobile, a representative frame element being indicated at 16 in FIGURE 1.

The apparatus of this invention comprises essentially a container 20 for water or some other cooling liquid which is supported on the frame 16 by means of any suitable type of bracket, such as that shown at 22 in FIGURE 1. The container 20 may be of any desired material, such as metal or plastic, and can be of any particular shape or size so as to readily conform to quick installation in any type of car or truck.

A fill cap 24 is provided for the container 20; and, for proper operating purposes, it should be kept practically completely full of water or some other cooling liquid.

A tube 30 is fitted into the top or cover of the container 20, and this tube is of a sufficient length and of a material so as to be readily fastened to the outlet end of the overflow pipe 14 of the radiator construction (FIGURE 2). An air tight fit must be provided at the joint between the tubes 14 and 30, and it is essential that the overflow pipe itself be free from leaks or holes. It is also essential that the valve in the radiator cap 12 will seal properly and will also open against its spring tension when the pressure inside the radiator arrives at a certain predetermined point. This predetermined spring pressure is preferably that which is normal for the particular type of radiator, automobile or truck.

A further tube 32 is fitted into the container 20 through the top or cover thereof, and this extends almost to the bottom of the container, as shown in FIGURE 2.

An extension 34 of this tube 32 leads to a perforated pipe 36, which extends across the front of the radiator, as best shown in FIGURES 1 and 3. This pipe is held in position by suitable brackets or clamps 38 and is closed at its outer end by a plug or the like 40.

The perforations are indicated at 42 in FIGURE 3, and can be of any desired size or number so as to insure efficient operation.

It will be obvious that the tube 30 can be a unitary structure or can be of metal, plastic, rubber or the like, and the same remarks apply to the three tubes 32, 34 and 36. These may comprise one single pipe or several and may be composed of one or different materials.

It is, of course, essential that the points at which the pipes or tubes 30 and 32 enter the container 20 are properly sealed and that the fill cap 24 will not allow any leakage of air, vapor or liquid.

From a consideration of this structure, it will be apparent that, if, as for example, driving a vehicle through an area of high temperatures, such as a desert, the water or other liquid in the radiator begins to boil, the vapor thus produced will escape past the spring-pressed valve in the cap 12 and exit through the overflow pipe 14. However, instead of merely escaping to the atmosphere, the vapor will pass through the tube 30 into the interior of the container 20 and will force water or other liquid out of the container through the pipes 32 and 34 to the perforated pipe 36, whence it will escape by way of a spray or droplets and dribble down over the face of the radiator 10. If the car is in motion or if the fan is operating a great deal of this, liquid will be drawn through the interstices of the radiator and between the fins thereof, providing a very satisfactory evaporative and cooling action. In fact, quite a quantity of this spray vapor or water will actually pass through the radiator to the engine itself, further enhancing the temperature reducing operation.

As soon as this occurs, undue boiling of the radiator stops and loss of cooling water therefrom is automatically prevented, enabling the operator of the car or truck to proceed normally, regardless of existing atmospheric temperature. Obviously, if the overheating is due to some condition in the engine itself, such condition will not be cured by the operation of the device of this invention, but the fact that the radiator and engine are both cooled to at least some degree will enable the driver to proceed for some additional distance to a point where engine or other repairs can be made.

In FIGURE 4 a slight variation of the invention is presented, wherein a sheet 50 of some relatively porous material, such as burlap or the like, is supported over the face of the radiator 10 in any suitable manner, and any water or cooling liquid escaping from the container 20 will, instead of flowing directly over metal, become absorbed in the porous element 50, providing a greater natural evaporation with consequent increased cooling effect accompanied by a reduced flow of water from the container 20.

It will be evident that herein is provided an automatic or manually controlled cooling apparatus for the radiators of automobiles, trucks and the like wherever internal combustion engines are employed and which will provide a great saving of trouble, delay and expense, particularly when driven through abnormally hot territory, such as desert areas, or when hauling an unusually heavy load or up steep grades or, in fact, wherever overheating of such an internal combustion engine is likely to occur. Vapor lock is also prevented or remedied.

The device will save many repair bills, not to mention loss of time or the attendant worry on the part of the driver, operator or passengers, requires practically no attention at any time after installation except keeping it filled with water and possible removal, emptying or filling with an anti-freeze composition in winter.

The obvious low cost, ease of installation, surety of operation provides many advantages which will be immediately apparent, either for the preferred apparatus or the adaptations or modifications herewith presented.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

In auxiliary cooling means for a motor vehicle cooling system of the type which includes an engine, a radiator, an overflow pipe for said radiator, and a radiator cap having a spring pressed valve and connections bebtween the engine and the radiator for circulation of a cooling fluid, the combination of: a perforated pipe mounted in front of the radiator at the upper end thereof, a sealed container on the vehicle for additional cooling fluid, a first conduit connecting said container and said perforated pipe, and a second conduit connecting said container and the overflow pipe of the radiator, whereby a rise in pressure in said radiator to a predetermined level is commiuncated to said container by said second conduit to force cooling fluid from said container through said first conduit and into said perforated pipe for discharge therefrom.

References Cited in the file of this patent

UNITED STATES PATENTS

| | | |
|---|---|---|
| 2,075,862 | Myers | Apr. 6, 1937 |
| 2,114,558 | Dismukes | Apr. 19, 1938 |
| 2,187,281 | Pagliaroni | Jan. 16, 1940 |
| 2,481,135 | Maness et al. | Sept. 6, 1949 |
| 2,514,253 | Partin | July 4, 1950 |
| 2,648,865 | Gordon et al. | Aug. 18, 1953 |
| 2,672,853 | Dunnigan | Mar. 23, 1954 |
| 2,715,394 | Humpola et al. | Aug. 16, 1955 |
| 2,878,794 | Stromberg | Mar. 24, 1959 |